United States Patent
Tsuruta (10) Patent No.: US 6,655,672 B2
(45) Date of Patent: Dec. 2, 2003

(54) AIR BEARING DRIVE SYSTEM

(75) Inventor: Atsushi Tsuruta, Kure (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

(21) Appl. No.: 10/189,868

(22) Filed: Jul. 3, 2002

(65) Prior Publication Data

US 2003/0006756 A1 Jan. 9, 2003

(30) Foreign Application Priority Data

Jul. 5, 2001 (JP) ......................................... 2001-205159

(51) Int. Cl.⁷ ................................................. B25B 11/00
(52) U.S. Cl. ........................................... 269/21; 269/20
(58) Field of Search ............................. 269/21, 20, 60, 269/48.1; 324/158.1; 29/559

(56) References Cited

U.S. PATENT DOCUMENTS

| | | | | |
|---|---|---|---|---|
| 4,236,693 A | * | 12/1980 | McCrea | 254/323 |
| 5,147,828 A | * | 9/1992 | Ebbing et al. | 269/8 |
| 5,427,363 A | * | 6/1995 | Rink et al. | 269/21 |
| 5,562,276 A | * | 10/1996 | Blick | 269/20 |
| 6,012,711 A | * | 1/2000 | Cipolla | 269/21 |
| 6,546,616 B2 | * | 4/2003 | Radowick | 29/720 |

FOREIGN PATENT DOCUMENTS

| | | |
|---|---|---|
| JP | 2000-120686 | 4/2000 |
| JP | 2000-348429 | 12/2000 |

* cited by examiner

*Primary Examiner*—Lee D. Wilson
(74) *Attorney, Agent, or Firm*—Rankin, Hill, Porter & Clark LLP (57) ABSTRACT

An air bearing drive system has a base, a moving portion, an air bearing for forming an air film gap between the base and the moving portion, air nozzles and a suction inlet. The air nozzles and suction inlet are formed on the base. The air nozzles blow air toward the moving portion so as to exert a levitation force on the moving portion. The suction inlet applies suction to the air film gap so as to attract the moving portion toward the base and thereby exert an attraction force on the moving portion. An air supplying device supplies air to the air nozzles. A vacuum source applies suction to the suction inlets. Two adjusting devices are adapted to adjust the levitation force produced by the air issuing from the air nozzles and the attraction force of air drawn into the suction inlet so as to provide an accurate and low cost air bearing drive system.

10 Claims, 5 Drawing Sheets

AIR BEARING DRIVE SYSTEM

BACKGROUND OF THE INVENTION

1. Field of the Invention

The present invention relates to air bearing drive systems, and more particularly, it relates to a mechanism of the drive system for controlling a gap of an air film (hereinafter, a gap of an air film is simply referred to as an air film gap) formed by an air bearing.

2. Description of the Related Art

Roundness testers are conventionally used for obtaining a variety of data about geometrical round precision of a cylindrical form such as roundness, concentricity, and coaxiality. By placing a workpiece on a turntable, rotating the workpiece by the turntable, and detecting a profile of the workpiece by a detection head, the roundness testers collect data about the profile of the workpiece, and then measure and calculate the geometrical round precision of the workpiece.

As disclosed, for example, in Japanese Unexamined Patent Application Publication Nos. 2000-120686 and 2000-348429, air bearings producing dramatically less frictional resistance, heat generation, and rotating vibration than ball bearings and the like are widely used for a variety of accurate drive systems, for example, for achieving a rotary motion of the turntable and a linear feed motion of the detection head of the roundness testers.

Figure 1:
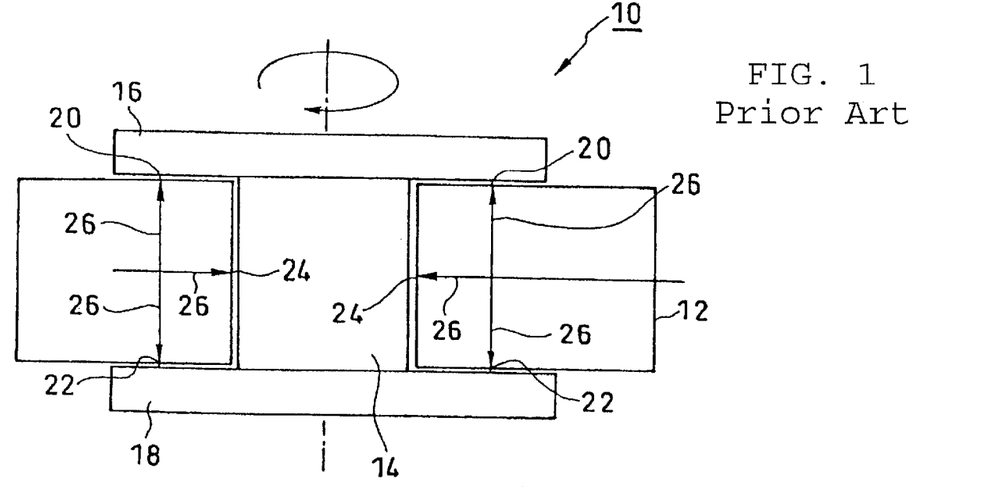
FIG. 1 is an illustration of a known air bearing drive system.

In general, a rotary drive system 10 using an air bearing shown in FIG. 1 has a stator (also referred to as base) 12, a rotor 14, an upper plate (also referred to as moving portion) 16, and a lower plate 18. The rotor 14 is formed integrally with the upper plate 16 and lower plate 18 and supported by the stator 12.

By supplying air 26, the lower surface of the upper plate 16 and the upper surface of the stator 12 have an upper air film gap 20 formed therebetween, the lower surface of the stator 12 and the upper surface of the lower plate 18 have a lower air film gap 22 formed therebetween, and the outer peripheral surface of the rotor 14 and the inner peripheral surface of the stator 12 have a tubular air film gap 24 formed therebetween. Thus, these gaps 20, 22, and 24 allow the rotor 14 to rotate smoothly together with the upper and lower plates 16 and 18 relative to the stator 12.

The drive system using the foregoing conventional air bearing has an air film gap generally formed between the base and each of the moving parts facing the base. For example, in the rotary drive system 10 shown in FIG. 1, the air flows in these three gaps 20, 22, and 24. In order to achieve an accurate rotation of the rotor 14 together with the upper and lower plates 16 and 18 while maintaining all the air film gaps, between the base and the moving parts facing the base, at respectively fixed amounts of spacing, all the foregoing upper and lower gaps 20 and 22 and tubular gap 24 are required to satisfy a large area of extremely strict precision, as described below, for example.

Within currently attainable levels of geometrical precision, for example, the stator 12 is required to satisfy flatness of its upper and lower surfaces, parallelism between the opposing surfaces (hereinafter, also referred to as surface-to-surface parallelism), squareness of the axis of its inner peripheral surface relative to the above surfaces, cylindricity of the inner peripheral surface, and so forth. Also, the rotor 14 is required to satisfy flatness of its upper and lower surfaces, parallelism between these surfaces, squareness of the axis of its outer peripheral surface relative to the above surfaces, cylindricity of the outer peripheral surface, and so forth. In addition, the upper plate 16 is required to satisfy flatness of its upper and lower surfaces and the like, and the lower plate 18 is required to satisfy flatness of its upper surface and the like.

However, since satisfying the foregoing variety of extremely strict geometrical precision requires a large amount of work and time for processing and finishing these components, and accordingly incorporates an increased cost of the drive system, a new drive system which can achieve a reduced cost has been strongly desired without deteriorating accurate and stable driving features required.

Furthermore, when the center of rotation and the center of gravity of a rotating workpiece placed on the upper plate 16 for measuring its roundness do not coincide with each other, an eccentric load is exerted on the rotating upper plate 16, causing the air film between the lower surface of the upper plate 16 and the upper surface of the stator 12 to vary in accordance with the rotation of the rotating workpiece, giving rise to a problem in that it is difficult to accurately measure geometrical round precision of the workpiece because the axis of the rotation center of the workpiece is tilted.

SUMMARY OF THE INVENTION

In view of the above-described problems of the related art, it is an object of the present invention to provide an air bearing drive system that offers a reduced cost and achieves accurate and stable driving performances.

The present invention is made to achieve the above object. An air bearing drive system according to the present invention comprises (a) a moving portion performing a rotational motion or a linear motion, (b) a base for supporting the moving portion, (c) an air bearing having an air film gap, for supporting the moving portion on the base, between the base and the moving portion, (d) at least one air nozzle, (e) air supplying means, (f) at least one suction inlet, (g) attracting means, and (h) two adjusting means.

The air nozzle is formed on the base and faces the moving portion, for forming the air film gap by blowing air toward the moving portion and exerting a levitation force on the moving portion. The air supplying means supplies air to the air nozzle.

The suction inlet is formed on the base and faces the moving portion, for exerting an attraction force on the moving portion so as to attract the moving portion toward the base. The attracting means attracts the moving portion toward the base via the suction inlet.

The two adjusting means adjust the levitation force produced by the air blowing from air nozzle and the attraction force from the suction inlet.

According to the present invention, by adjusting the thickness of the air film between the moving portion and the base by using the air nozzle and the suction inlet, the thickness of the air film can be fine-tuned or adjusted without making increasing the size of the air bearing.

Further, in the air bearing drive system according to the present invention, it is preferable that the moving portion comprises a cylindrical rotor and a moving flat surface orthogonal to the axial center of the rotor, the base comprises at least one thrust flat surface facing the moving flat surface, and the thrust flat surface comprises the air nozzle and the suction inlet formed thereon so that the moving flat surface is levitated, at a prescribed height via the air film, relative to the thrust flat surface.

According to the present invention, the moving portion can be easily positioned in a non-contact manner since the moving portion has a levitation height controlled in the thrust direction thereof.

Further, in the air bearing drive system according to the present invention, the thrust flat surface is preferably a single surface disposed on one side of the stator.

Since the air bearing drive system according to the present invention has a smaller number of elements of components requiring precise processing, unskilled workers can process the components. Accordingly, a reduced processing cost of the components is achieved without a risk of deteriorating rotation accuracy of the drive system.

Further, in the air bearing drive system according to the present invention, the base may have a cylindrical opening therein for supporting the rotor in the radial direction of the rotor. Also, the base may comprise a plurality of the air nozzles disposed on the peripheral surface of the cylindrical opening so that the rotor is positioned in the center of the cylindrical opening.

According to the present invention, since the rotor is positioned in the center of the cylindrical opening in a non-contact manner, the air bearing drive system has an integrally formed radial and thrust bearing, leading to a reduced size of the drive system.

Further, in the air bearing drive system according to the present invention, either the air nozzle or the suction inlet may have a groove-shape.

According to the present invention, since the thickness of the air film between the base and the moving portion can be controlled easily and a variation in the thickness can be reduced accordingly, the drive system has improved driving accuracy.

Further, in the air bearing drive system according to the present invention, the moving portion may further comprise an anti-slip member for preventing the moving portion from slipping out from the base.

According to the present invention, a possibility of an accident during conveyance and the like can be eliminated.

Further, the drive system according to the present invention is preferably used for driving a turntable of a roundness tester.

Accordingly, the present invention provides a roundness tester comprising a precise rotary driving mechanism at a low cost.

Further, the air bearing drive system according to the present invention may further comprise controlling means for controlling the adjusting means to adjust a balance of the levitation force and the attraction force exerted on the moving portion so that the air film gap between the base and the moving portion maintains a required uniform thickness when the moving portion has the levitation force and the attraction force exerted thereon, wherein (i) at least one group of the plurality of the air nozzles and the plurality of the suction inlets is disposed on the base, (ii) the corresponding adjusting means independently adjusts at least one of a part of the levitation force by using each of the air nozzles and a part of the attraction force by using each of the suction inlets, and (iii) the control means controls the corresponding adjusting means to perform the above-stated independent adjustment so that the air film gap between the base and the moving portion maintains the required uniform thickness when the moving portion has the levitation force and the attraction force exerted thereon.

The required uniform thickness of the air film gap as described above is achieved by adjusting surface-to-surface parallelism and the like of the air film gap, for example, by adjusting a height and an angle of the moving portion relative to the base.

According to the present invention, even when an eccentric load is exerted on the rotating moving portion when the center of rotation and the center of gravity of a rotating workpiece placed on the moving portion for measuring its roundness do not coincide with each other, the air film between the lower surface of the moving portion and the upper surface of the base is controlled so as to have a constant thickness in accordance with a rotation of the rotating workpiece, thereby achieving an accurate rotation of the workpiece without tilting the axis of the rotation center of the workpiece.

Further, in the air bearing drive system according to the present invention, the control means may comprise at least one gap sensor, concentrically disposed with the peripheral circle of the rotor, for measuring a levitation height of the moving flat surface relative to the thrust flat surface.

According to the present invention, since the levitation height of the moving flat surface relative to the thrust flat surface can be measured accurately, a slanted angle of the moving flat surface can be calculated more accurately, allowing the control means to control the levitation height more accurately, thereby achieving a more accurate rotation of the workpiece.

Further, in the air bearing drive system according to the present invention, the control means may comprise at least one pressure sensor for measuring a negative pressure.

According to the present invention, since the pressure sensor for measuring a negative pressure is disposed in the air suction line, the levitation height of the moving flat surface relative to the thrust flat surface can be maintained constant regardless of the weight of the workpiece by adjusting the negative pressure so as to maintain the attraction force constant.

As described above, the drive system according to the present invention comprises (a) the base, (b) the moving portion, (c) at least one air nozzle formed on the upper surface of the base for blowing air toward the moving portion so as to exert a levitation force on the moving portion, (d) at least one suction inlet also formed on the upper surface of the base for attracting the moving portion toward the base so as to exert an attraction force on the moving portion, and (e) two adjusting means, one for adjusting the levitation force from the air nozzle and the other for adjusting the attraction force from the suction inlet. With this configuration, the adjusting means adjust a balance of the levitation force and the attraction force so as to form an air film gap having a required uniform thickness, thereby achieving a reduced cost as well as an accurate and stable drive of the drive system.

In the drive system according to the present invention, at least one group of a plurality of the air nozzles and a plurality of the suction inlets is disposed on the base. The corresponding adjusting means independently adjust at least one of a part of the levitation force by using each of the plurality of air nozzles and a part of the attraction force by using each of the plurality of suction inlets. Also, the drive system comprises control means for controlling the corresponding adjusting means to perform the above independent adjustment, thereby achieving further accurate and stable driving performances of the drive system.

BRIEF DESCRIPTION OF THE DRAWINGS

FIGS. 6A to 7B are illustrations of an operation of the air bearing.

DETAILED DESCRIPTION OF THE PREFERRED EMBODIMENTS

Figure 2:
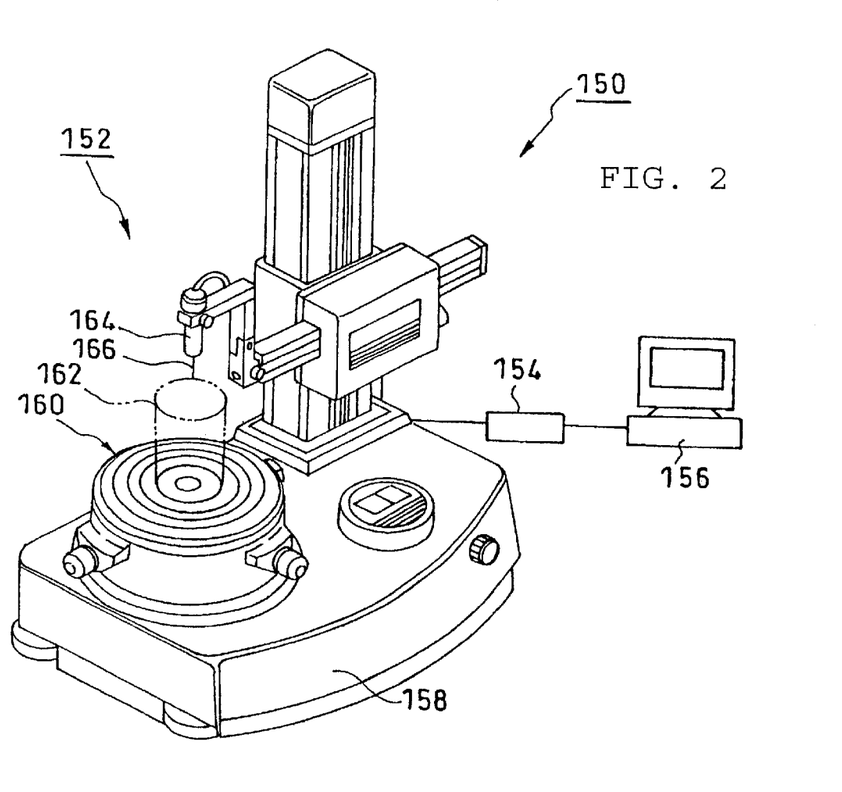
FIGS. 2 and 3 are schematic views illustrating the configuration of an air bearing drive system, according to an embodiment of the present invention, applied to a roundness tester.
Figure 3:
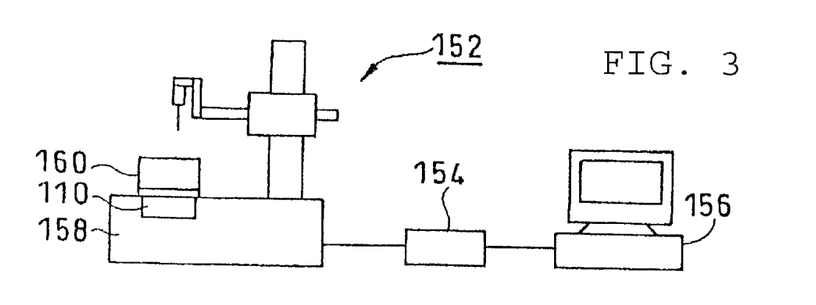

FIGS. 2 and 3 are schematic views of the configuration of an air bearing drive system, according to an embodiment of the present invention, applied for rotating a turntable of a roundness tester.

A roundness tester 150 shown in FIG. 2 has a main unit 152, an electrical unit 154, and a computer 156.

The main unit 152 has a platform 158 and a turntable 160 disposed on the platform 158 via an air bearing drive system 110 according to the embodiment, and the turntable 160 has a workpiece 162 placed thereon. The computer 156 inputs a drive command into the electrical unit 154 so as to rotate the turntable 160 at a given speed by means of the conventional motor (not shown). The rotating speed of the turntable 160 is sequentially detected by a rotary encoder (not shown) disposed below the turntable 160, and the detected values are input into the computer 156 in a form of digital signals.

Also, the main unit 152 has a detection head 164, for detecting irregularities of the profile of the workpiece 162, and a stylus 166 attached on the detection head 164. Displacement detection signals from the detection head 164 are converted into digital signals by the electrical unit 154 and are sequentially input into the computer 156. The stylus 166 is constantly urged against the detection head 164, for example, in the radial direction of the turntable 160. By allowing the turntable 160 to rotate the workpiece 162 while the tip of the stylus 166 is kept in contact with the workpiece 162, the detection head 164 detects an amount of displacement of the stylus 166 caused by the irregularities of the profile of the workpiece 162. The displacement detection signals from the detection head 164 together with the detection signals of the rotating speed from the rotary encoder are stored in the computer 156. The measured data is computed for obtaining roundness, coaxiality, and so forth by using calculation methods such as the least-squares method and the minimal domain method when needed.

For example, in order to achieve an accurate rotation of the turntable 160 of the roundness tester 150, an air bearing drive system, which generates dramatically less frictional resistance, heat generation, rotating vibration, and so forth, is generally used. The air bearing drive system 110 is disposed, for example, below the turntable 160 of the main unit 152 as shown in FIG. 3. Although the turntable 160 using an air bearing is required to have extremely high rotation accuracy, achieving such accuracy of rotation requires extremely strict geometrical precision of each element of the base and the moving parts facing the base, leading to a large amount of work and time for processing and finishing these components, and accordingly leading to an increased cost of the drive system 110.

Figure 4:
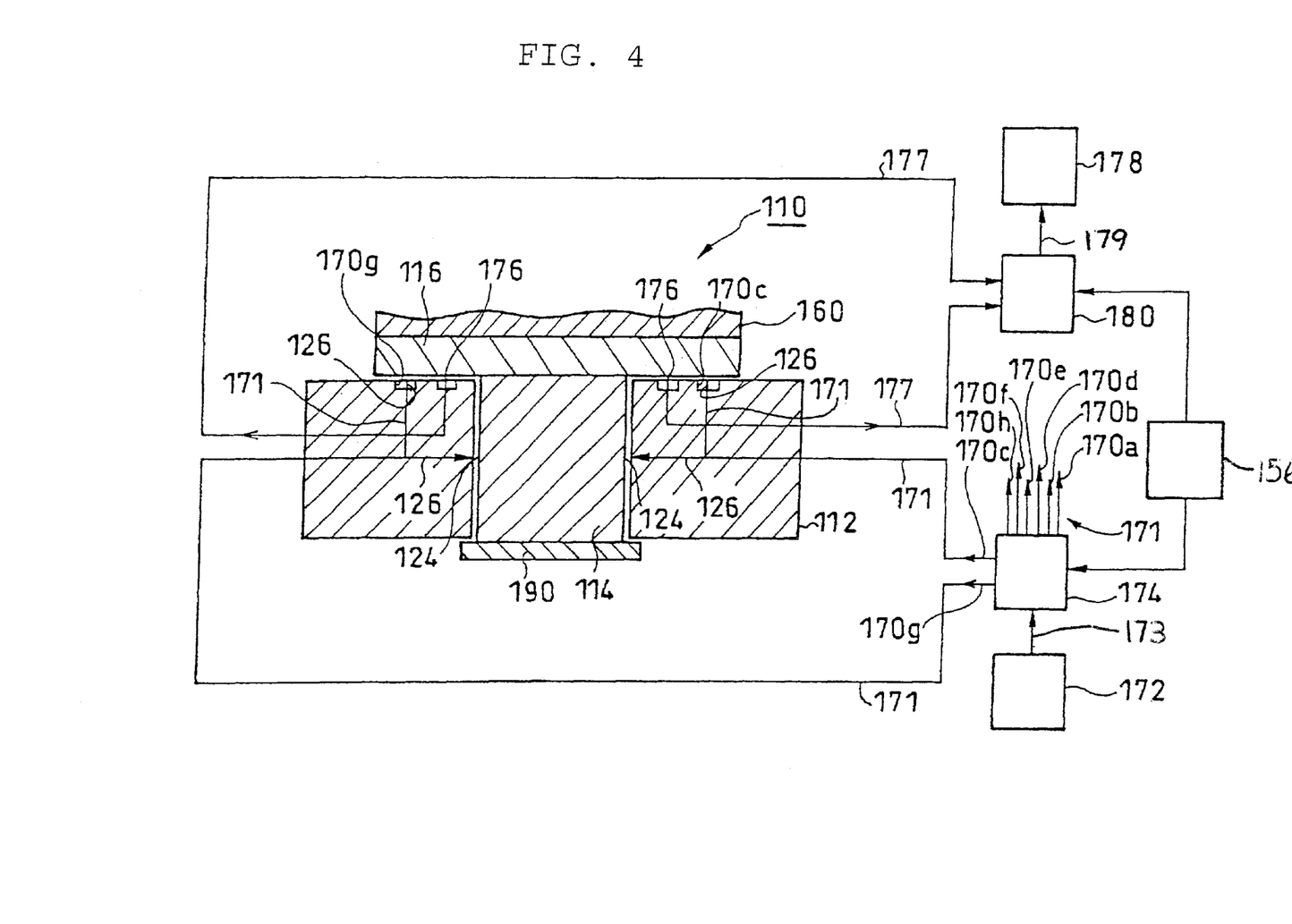
FIG. 4 illustrates a vertical section of an air bearing according to the present invention and the other schematic configuration of the drive system using the air bearing.
Figure 5:
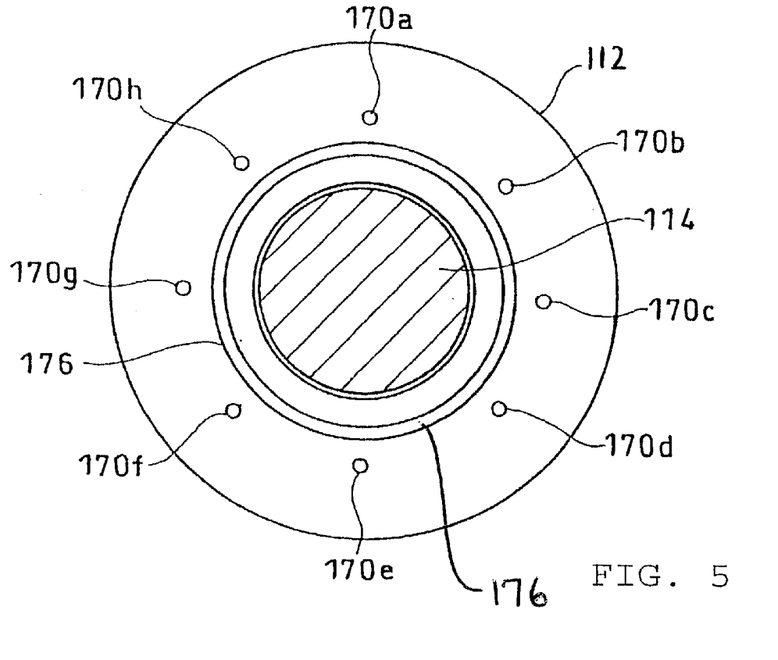
FIG. 5 is a top view of air nozzles and a suction inlet of the air bearing.

In view of the above problems, a self-attraction and levitation type air bearing shown in FIGS. 4 and 5 is employed in order to reduce the total number of elements requiring costly geometrical precision in the drive system 110 according to the embodiment. For example, surface-to-surface parallelism is achieved not by the conventional way of processing and finishing the components, but by adjusting an air film gap of a self-attraction and levitation type air bearing at a given amount of spacing. FIG. 4 illustrates a vertical section of an air bearing according to the embodiment and the schematic configuration of the drive system 110 using the air bearing. FIG. 5 is a top view of air nozzles and a suction inlet of the air bearing.

The drive system 110 using the air bearing according to the embodiment is provided with a gap control mechanism by using an air film in a gap between the upper surface (i.e., thrust flat surface) of a stator (i.e., base) 112 and the lower surface (i.e., moving flat surface), orthogonal to the axis of a rotor 114, of an upper plate (i.e., moving portion) 116. With this configuration, air blows toward the inner peripheral surface and the upper surface of the stator 112.

The stator 112 has a plurality of air nozzles 170a to 170h on the upper surface thereof at a given pitch, concentrically disposed with the peripheral circle of the rotor 114. Also, the drive system 110 has a plurality of air supplying lines 171, air supplying means 172, main air supply line 173, air-supply adjusting means 174, and the computer (i.e., control means) 156.

The air nozzles 170a to 170h are connected, via the air supplying lines 171, to the air-supply adjusting means 174. The air-supply adjusting means 174 is connected, via the main air supply line 173, to the air supplying means 172.

With these connections, the air supplying means 172 supplies air 126 to each of the air nozzles 170a to 170h through the corresponding air supplying lines 171 via the air-supply adjusting means 174.

The computer 156 is connected to the air-supply adjusting means 174 and controls an operation of the air-supply adjusting means 174 so that an amount of air blowing from each of the air nozzles 170a to 170h is independently adjustable. By adjusting the amount of air blowing from each of the air nozzles 170a to 170h, a levitation force exerted on the lower surface of the upper plate 116 can be adjusted at each of the air nozzles 170a to 170h.

An amount of air blowing into a tubular gap between the outer peripheral surface of the rotor 114 and the inner peripheral surface of the stator 112 is basically fixed.

In the drive system 110 according to the embodiment, since the gap control mechanism by using an air film is provided between the upper surface of the stator 112 and the lower surface of the upper plate 116 as describe above, an attraction force of the air is set in a direction perpendicular to the above upper surface, and the stator 112 has an approximately O-shaped ring-like vacuum suction groove (also referred to as suction inlet) 176 on the upper surface thereof and inside a circle formed by the air nozzles 170a to 170h. Also, the drive system 110 has a plurality of air suction lines 177, vacuuming means (i.e., attracting means) 178, main air suction line 179, air-suction adjusting means 180, and the computer (i.e., control means) 156.

The vacuum suction groove 176 is connected, via at least one air suction line 177, to the air-suction adjusting means 180. The air-suction adjusting means 180 is connected, via the main air suction line 179, to the attracting means 178.

With these connections, the vacuuming means 178 draws or vacuums air in the vacuum suction groove 176 through the air suction line 177 via the air-suction adjusting means 180.

The computer 156 is connected to the air-suction adjusting means 180 and controls an operation of the air-suction adjusting means 180 so that an amount of air drawn or suctioned from the vacuum suction groove 176 is adjusted. By adjusting the amount of air drawn or suctioned from the vacuum suction groove 176, an attraction force exerted on the lower surface of the upper plate 116 can be adjusted.

The stator 112 has three capacitance type gap sensors (not shown) on the upper surface thereof at a 120-degree pitch, concentrically disposed with the peripheral circle of the rotor 114, for measuring distances at the three points between the upper surface of the stator 112 and the lower surface of the upper plate 116. The computer 156 receives outputs of the gap sensors with respect to the three distances and computes a slant of the lower surface of the upper plate 116 relative to the upper surface of the stator 112. On the basis of the computed result, the computer 156 independently adjusts an amount of air blowing from each of the air nozzles 170a to 170h so as to correct for the slant of the upper plate 116 by controlling the air-supply adjusting means 174. A correcting operation for the above slant is always performed. Accordingly, even when a direction of the slant varies with rotation of the upper plate 116, the slant is corrected as needed by adjusting the amount of air blowing from each of the air nozzles 170a to 170h so as to be an optimal amount.

As a result, the drive system 110 according to the embodiment does not require precise processing and finishing of the components in a conventional manner for achieving geometrical precision of the surface-to-surface parallelism of the components. Instead, as shown in FIGS. 6A to 7B, when the upper plate 116 has a levitation force from the air nozzles 170a to 170h together with an attraction force from the vacuum suction groove 176 exerted on the lower surface thereof, the computer 156 controls an operation of each adjusting means so as to form a gap having a required uniform thickness of an air film between the upper surface of the stator 112 and the lower surface of the upper plate 116 by adjusting the balance of the levitation force and the attraction force, thereby allowing the upper plate 116 to be positioned on the stator 112 in a non-contact manner.

Accordingly, the parallelism between the upper surface of the stator 112 and the lower surface of the upper plate 116 can be improved by controlling the air film gap so as to have a required uniform thickness.

The foregoing configuration allows the turntable 160 to rotate accurately and stably and eliminates costly processing and finishing of the components for achieving the geometrical precision of the surface-to-surface parallelism of the components in a conventional manner.

Figure 6A:
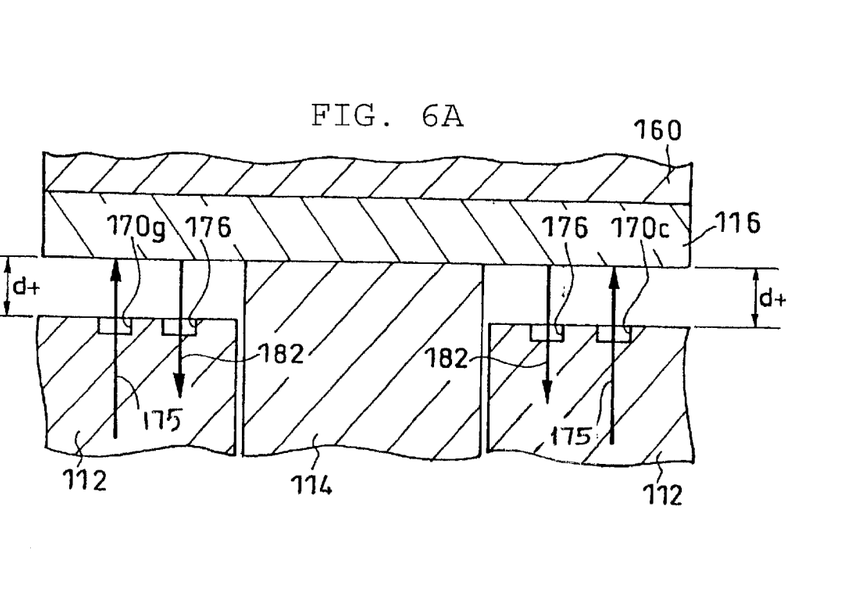
Figure 6B:
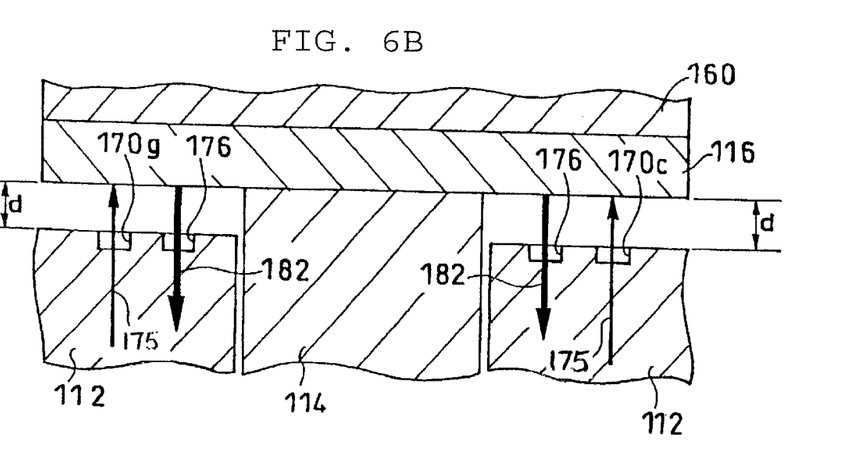

Referring now to FIGS. 6A to 7B, an exemplary operation of the air bearing will be described. When the upper plate 116 lies at a levitation height d+, which is greater than a prescribed height d, relative to the stator 112 as shown in FIG. 6A, the computer controls each adjusting means so as to reduce the amount of air blowing from the air nozzles 170a to 170h, while the amount of air suctioned from the vacuum suction groove 176 is kept constant, when the upper plate 116 has an attraction force 182 from the vacuum suction groove 176 exerted on the lower surface thereof. Then, although the upper plate 116 has a levitation force 175 produced by air blowing from the air nozzles 170a to 170h together with the attraction force 182 from the vacuum suction groove 176 exerted on the lower surface thereof, the amount of air suctioned from the vacuum suction groove 176, i.e., the attraction force, becomes relatively larger, and accordingly, as shown in FIG. 6B, the upper plate 116 moves down toward the stator 112, resulting in the gap, having the required uniform thickness d of an air film, between the upper surface of the stator 112 and the lower surface of the upper plate 116.

Figure 7A:
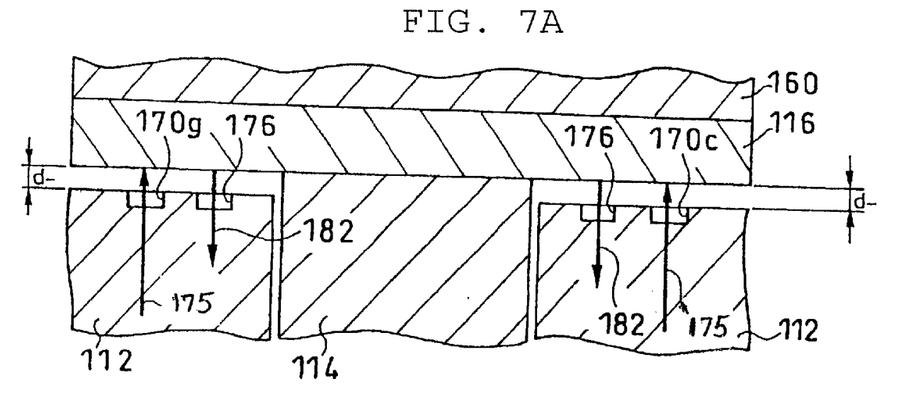
Figure 7B:
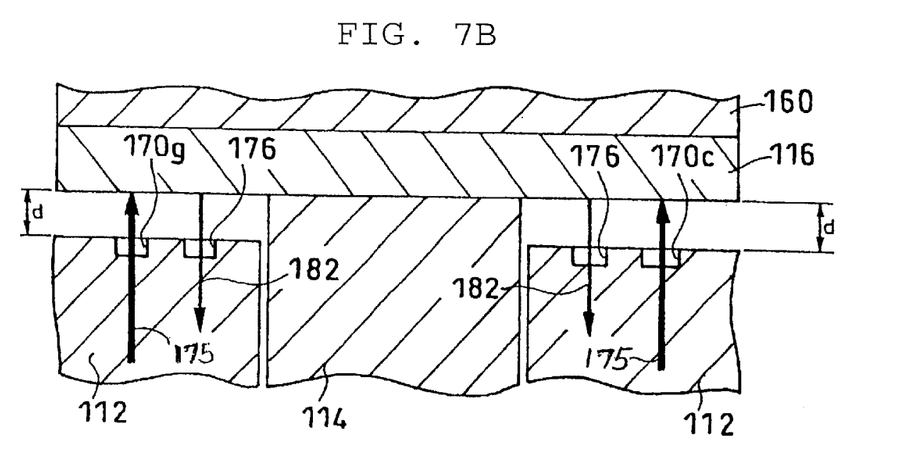

On the other hand, when the upper plate 116 lies at a levitation height d−, which is smaller than the required height d, relative to the stator 112 as shown in FIG. 7A, the computer controls each adjusting means so as to increase the blowing rates, while the attraction force 182 is kept constant, when the upper plate 116 has the attraction force 182 from the vacuum suction groove 176 exerted on the lower surface thereof. Then, although the upper plate 116 has the levitation force 175 produced by air blowing from the air nozzles 170a to 170h together with the attraction force 182 from the vacuum suction groove 176 exerted on the lower surface thereof, the amount of air blowing from the air nozzles 170a to 170h, i.e., the levitation force, becomes relatively larger, and accordingly, as shown in FIG. 7B, the upper plate 116 moves up, resulting in the gap having the required uniform thickness d of an air film between the upper surface of the stator 112 and the lower surface of the upper plate 116.

As shown in FIG. 4, the base or stator 112 has a cylindrical opening therein and a plurality of air nozzles 124 on the inner peripheral surface of the cylindrical opening so as to press the outer peripheral surface of the cylindrical rotor 114 by air in the radial direction of the rotor 114, thereby allowing the rotor 114 to be positioned in a non-contact manner such that the axial center of the rotor 114 coincides with that of the cylindrical opening.

The rotor 114 has an anti-slip member 190, as shown in FIG. 4, fixed on the lower surface thereof for eliminating the possibility of the rotor 114 from slipping out during the conveyance of the roundness tester 150 and the like. The lower surface of the rotor 114 and the anti-slip member 190 do not require highly precise processing.

As described above, the drive system 110 according to the embodiment does not require precise processing and finishing of the components in a conventional manner for achieving geometrical precision of the surface-to-surface parallelism of the components. Instead, when the upper plate 116 has a levitation force from the air nozzles 170a to 170h together with an attraction force from the vacuum suction groove 176 exerted thereon, the computer 156 controls an operation of each adjusting means so as to form an air film gap having a required uniform thickness between the upper surface of the stator 112 and the lower surface of the upper plate 116 by adjusting the balance of the levitation force and the attraction force. This arrangement improves the parallelism between the upper surface of the stator 112 and the lower surface of the upper plate 116, thereby allowing the turntable 160 to rotate accurately and stably.

Also, the conventional requirement for geometrical precision such as parallelism between the upper surface of the stator and the lower surface of the upper plate can be eliminated. Furthermore, in place of the conventional lower plate, it is simply sufficient to provide the drive system 110 according to the embodiment with the anti-slip member 190, which serves to prevent the rotor 114 from slipping out accidentally. Accordingly, the conventional requirement for geometrical precision such as parallelism between the lower surface of the stator and the upper surface of the lower plate can be eliminated. As a result, the total number of elements requiring geometrical precision decreases to about two thirds of that of the conventional drive system, allowing the drive system 110 according to the embodiment to have a simple structure and achieve an accurate rotation, and thereby leading to a reduced cost of the drive system 110 due to a reduced number of steps for processing and finishing the components.

As described in the embodiment, accurate controlling of the air film gap to be constant is practically realized for the first time by adjusting amounts of air introduced into, and removed from, the air film gap, wherein the upper plate 116 has a levitation force produced by air blowing from the air nozzles 170*a* to 170*h* together with an attraction force produced by air suctioned from the vacuuming groove 176 exerted thereon.

The foregoing accurate controlling of the air film gap to be constant cannot be achieved by simply blowing air and recovering it in a known manner, nor by either simply blowing air from the air nozzles 170*a* to 170*h* or suctioning air from the vacuum suction groove 176. Simply adjusting an amount of blowing air is not enough for controlling the air film gap to be constant, since changing the amount of blowing air causes the upper plate 116 to vibrate or flutter. Even when the amount of blowing air is controlled in a prescribed manner, it is often the case that the actual air film gap does not vary in a prescribed manner, leading to a conclusion in that controlling the air film gap finely and quickly so as to provide the gap with a required thickness is difficult.

As opposed to the above way of controlling the air film gap, in the present invention adjusting amounts of blown air and suctioned air causes the upper plate 116 to move in a prescribed manner in accordance with the amounts of blown air and suctioned air, when these amounts are adjusted, and accordingly the thickness of the air film gap varies in a prescribed manner. As described above, the upper plate 116 can be controlled more reliably, leading to fine and quick controlling of the air film gap. Such controlling of the gap can be achieved only by adjusting the amounts of blowing air and suction air when the upper plate 116 has a levitation force from the air nozzles 170*a* to 170*h* together with an attraction force from the vacuum suction groove 176 exerted thereon as in the previously described and preferred embodiment.

Although an air bearing applied for achieving a rotary motion of the turntable 160 of the roundness tester 150 is described by way of example in this embodiment, the air bearing is also suitably used for achieving a linear motion necessary for an accurate and stable feed motion, for example, of the detection head 164 of the roundness tester 150. However, the present invention is not limited to roundness testers, but is applicable to any air bearing drive systems. Moreover, the present invention is not limited to the foregoing configurations of the air nozzles and the suction inlet.

Furthermore, although the foregoing configuration, in which the air nozzles are plural, the suction inlet has a groove shape, and a levitation force from the air nozzles and an attraction force from the suction inlet are balanced by adjusting the levitation force while the attraction force is kept constant when the moving portion has the levitation force together with the attraction force exerted thereon, is described by way of example, other configurations can be employed as long as an air film gap is controlled by adjusting a levitation force from an air nozzle and an attraction force from a suction inlet when the moving portion has the levitation force together with the attraction force exerted thereon.

For example, it is preferable to balance a levitation force from an air nozzle and an attraction force from suction inlets by configuring the air nozzle in a groove-like shape and the suction inlets to be plural, and by adjusting the attraction force while the levitation force is kept constant when the moving portion has the levitation force together with the attraction force exerted thereon.

It is also preferable to balance a levitation force from the air nozzles and an attraction force from the suction inlet, when the moving portion has the levitation force together with the attraction force exerted thereon.

For example, if, before control operation starts, the upper plate 116 has its right half slanted upwardly relative to the stator 112, with respect to the center line drawn from the air nozzles 170*a* to 170*e*, then the smallest air film gap lies in the vicinity of the air nozzle 170*g* and the largest air film gap lies in the vicinity of the air nozzle 170*c*. When the control operation starts, the computer 156 controls the air-supply adjusting means 174 for independently adjusting amounts of air blowing from the air nozzles 170*a* to 170*h*, and while the upper plate 116 has an attraction force from the suction groove 176 exerted on the lower surface thereof, so that the surface-to-surface parallelism of the gap formed by the above air film is corrected. Accordingly, the stator 112 and the upper plate 116 have an air film gap of the required uniform thickness.

As a result, the upper plate 116 has a gap having a required uniform thickness relative to the stator 114, thereby achieving required parallelism between the upper surface of the stator 112 and the lower surface of the upper plate 116 without requiring strict geometrical precision for processing and finishing the stator 112, the upper plate 116, etc. This configuration allows the drive system 110 to achieve a reduced cost for processing and finishing the components thereof and also allows the turntable 160 to rotate accurately and stably.

As opposed to the above described situation, if the upper plate 116 has its left half slanted upwardly relative to the stator 112, with respect to the center line drawn from the air nozzles 170*a* to 170*e*, then the largest air film gap lies in the vicinity of the air nozzle 170*g* and the smallest air film gap lies in the vicinity of the air nozzle 170*c*. Therefore, when control stars, the computer 156 controls the air-supply adjusting means 174 for independently adjusting amounts of air blowing from the air nozzles 170*a* to 170*h*, while the upper plate 116 has an attraction force from the suction groove 176 exerted on the lower surface thereof, so that surface-to surface parallelism of the above air film gap is corrected. Accordingly, the stator 112 and the upper plate 116 have an air film gap with a required uniform thickness.

As a result, the upper plate 116 has a gap having a required uniform thickness relative to the stator 114, thereby achieving required parallelism between the upper surface of the stator 112 and the lower surface of the upper plate 116 without requiring strict geometrical precision for processing and finishing the stator 112, the upper plate 116, etc. This configuration allows the drive system 110 to achieve a reduced cost for processing and finishing the components thereof and also allows the turntable 160 to rotate accurately and stably.

As described above, by balancing the levitation force 175 from the air nozzles 170*a* to 170*h* and the attraction force 182 from the vacuum suction groove 176, when the upper plate 116 has the levitation force 175 together with the attraction force 182 exerted on the lower surface thereof, the computer 156, i.e., the control means, controls the air film gap so as to maintain a required uniform thickness, thereby allowing the turntable 160 to rotate accurately and stably.

Furthermore, it is preferable to provide the roundness tester 150 with additional functions such as an automatic detection of a thickness of an air film gap and an automatic control of surface-to-surface parallelism on the basis of detection results for achieving easy handling.

Although the drive system 110 is provided with three gap sensors by way of example in the above-described embodiment, a detection sensor for detecting a thickness of an air film gap between the stator 112 and the upper plate 116 may be disposed at each of the air nozzles 170a to 170h in place of the above gap sensors and may be connected to the computer 156 via the electrical unit 154. The computer 156 has storing means for storing control information for achieving required surface-to-surface parallelism between the stator 112 and the upper plate 116, and also for adjusting amounts of blowing air and suctioned air in response to a thickness of each air film gap.

Also, the computer 156 has signal input means and a CPU. When the CPU of the computer 156 receives a command signal for controlling the air film gap via the input means, the computer 156 reads the detection results of the sensors via the electrical unit 154.

On the basis of the read detection results, the CPU computes each amount of blown air and suction air for achieving the required surface-to-surface parallelism from the control information stored in the storing means and inputs the computed values into the adjusting means 174 and 180. Since the adjusting means 174 and 180 operate in response to the computed values, for example, the surface-to-surface parallelism can be adjusted automatically based on the detection data of the sensors, which detect each air film gap, and also based on the detection results of the computer 156 and the adjusting means 174 and 180.

Since the sensors detect a gap of each air film in real time when the roundness tester 150 is in operation, the computer 156 and the adjusting means 174 and 180 perform an automatic control for adjusting the surface-to-surface parallelism in response to the detection results when the thickness of the gap varies, thereby providing easy handling and always maintaining high geometrical precision of the surface-to-surface parallelism and the like.

Although the foregoing gap sensors are of a capacitance type, non-contact sensors of an electromagnetic type, an optical type, and the like may be used.

Instead of the computer 156 used in the drive system 110 according to the foregoing embodiment, the air-supply adjusting means 174 may be controlled automatically by using pneumatic micrometers serving as gap sensors and also by using a pressure operator for computing an air pressure.

Furthermore, although the air-supply adjusting means 174 and the attracting means 178 adjust amounts of blowing air and suction air, respectively, in the above-described embodiment, instead of this configuration, the air suction lines 177 may be provided with a pressure sensor for measuring a negative pressure (i.e., a sensor for measuring an attraction force), and the air-suction adjusting means 180 may adjust an amount of suction air so as to keep a negative pressure (i.e., an attraction force) constant while keeping an amount of blowing air constant. With this configuration, when the workpiece 162 placed on the turntable 160 is heavy and the gap becomes smaller, the gap has less air blown therein and, accordingly, has an increased negative pressure (i.e., an increased degree of vacuum). By reducing the negative pressure, i.e., by reducing the attraction force, so as to restore the negative pressure to the prescribed value, the amount of air drawn or suctioned from the gap decreases, causing the gap to become wider. On the other hand, when the workpiece 162 is light and the gap becomes wider, reducing the attraction force so as to increase an amount of air blowing into the gap causes the gap to become narrower. In other words, by disposing a sensor for measuring a negative pressure in the air suction lines 177 for suctioning air from the suction inlet 176 and also by adjusting the negative pressure so as to maintain the attraction force constant, the levitation height of the moving flat surface can be maintained constant relative to the thrust flat surface, regardless of the weight of the workpiece 162. The number of the pressure sensors for measuring a negative pressure may be at least one; however, a plurality of the pressure sensors may be disposed when the air suction lines 177 are complicated.

What is claimed is:

1. An air bearing drive system comprising:
   a moving portion adapted for at least one of a rotational motion and a linear motion;
   a base for supporting the moving portion;
   an air bearing comprising an air film gap, between the base and the moving portion, for supporting the moving portion on the base;
   at least one air nozzle, formed on the base and facing the moving portion, adapted to form the air film gap by blowing air toward the moving portion and thereby exerting a levitation force on the moving portion;
   means for supplying air to the air nozzle;
   at least one suction inlet, formed on the base and facing the moving portion, for exerting an attraction force on the moving portion so as to attract the moving portion toward the base;
   means for attracting the moving portion toward the base via the suction inlet; and
   first and second adjusting means, said first adjusting means being adapted to adjust the levitation force produced by the air blowing from the air nozzle, and the second adjusting means being adapted to adjust the attraction force from the suction inlet.

2. The air bearing drive system according to claim 1, wherein the moving portion comprises a cylindrical rotor and a moving flat surface orthogonal to an axial center of the rotor, the base has at least one thrust flat surface facing the moving flat surface, and the thrust flat surface comprises the air nozzle and the suction inlet formed thereon so that the moving flat surface is levitated, at a prescribed height via the air film, relative to the thrust flat surface.

3. The air bearing drive system according to claim 2, wherein the thrust flat surface is a single surface.

4. The air bearing drive system according to claim 2, wherein the base has a cylindrical opening therein for supporting the rotor in a radial direction of the rotor, and has a plurality of inwardly directed air nozzles disposed on the peripheral surface of the cylindrical opening so that air issuing from said plurality of inwardly directed air nozzles maintains the rotor in a center of the cylindrical opening.

5. The air bearing drive system according to claim 2, wherein the moving portion further comprises an anti-slip member, said anti-slip member being operable to prevent the moving portion from slipping out of the base.

6. The air bearing drive system according to claim 1, wherein one of said at least one air nozzle and said at least one suction inlet has a groove-shape.

7. A roundness tester comprising an air bearing drive system according to claim 1, wherein the drive system drives a turntable of the roundness tester.

8. The air bearing drive system according to claim 1, further comprising:

means for controlling the adjusting means to adjust a balance of the levitation force and the attraction force exerted on the moving portion so that the air film gap between the base and the moving portion maintains a required uniform thickness when the moving portion has the levitation force and the attraction force exerted thereon, wherein at least one group of the at least one air nozzle and the at least one suction inlet is disposed on the base, wherein the first and second adjusting means independently adjusts at least one of the levitation force and the attraction force via the at least one air nozzle and the at least one suction inlet, respectively, and wherein the control means controls the first and second adjusting means to perform the independent adjustment so that the air film gap between the base and the moving portion maintains the required uniform thickness when the moving portion has the levitation force and the attraction force exerted thereon.

9. The air bearing drive system according to claim 8, wherein the control means comprises at least one gap sensor disposed concentrically with a peripheral surface of the rotor, said at least one gap sensor being adapted to measure a levitation height of the moving flat surface relative to the thrust flat surface.

10. The air bearing drive system according to claim 8, wherein the control means comprises at least one pressure sensor for measuring a negative pressure associated with said at least one suction inlet.

* * * * *